United States Patent
Goit et al.

(10) Patent No.: US 10,989,626 B2
(45) Date of Patent: Apr. 27, 2021

(54) SYSTEMS, METHODS, AND DEVICES FOR PERFORMANCE MONITORING OF MECHANICAL ASSEMBLIES

(71) Applicant: The Boeing Company, Chicago, IL (US)

(72) Inventors: Matthew Carl Goit, League City, TX (US); Bryan Craig Murphy, Houston, TX (US); Carter Reznik, Houston, TX (US)

(73) Assignee: The Boeing Company, Chicago, IL (US)

( * ) Notice: Subject to any disclaimer, the term of this patent is extended or adjusted under 35 U.S.C. 154(b) by 343 days.

(21) Appl. No.: 14/869,889

(22) Filed: Sep. 29, 2015

(65) Prior Publication Data

US 2017/0089804 A1   Mar. 30, 2017

(51) Int. Cl.
*G01M 13/00* (2019.01)
*G01M 13/04* (2019.01)

(52) U.S. Cl.
CPC ............ *G01M 13/00* (2013.01); *G01M 13/04* (2013.01)

(58) Field of Classification Search
CPC ....................................................... G01D 1/18
See application file for complete search history.

(56) References Cited

U.S. PATENT DOCUMENTS

| | | | | |
|---|---|---|---|---|
| 5,145,130 A * | 9/1992 | Purves | ....................... | B25J 5/00 244/159.4 |
| 5,608,845 A * | 3/1997 | Ohtsuka | .................. | G07C 3/00 702/34 |
| 7,457,785 B1 * | 11/2008 | Greitzer | .................. | G01D 1/18 706/12 |
| 2007/0058892 A1 * | 3/2007 | Motohashi | .......... | B60B 27/0005 384/448 |
| 2009/0204237 A1 * | 8/2009 | Sustaeta | ............. | G05B 13/0285 700/36 |

OTHER PUBLICATIONS

Dellacorte, Christopher et al., "ISS Solar Array Alpha Rotary Joint (SARJ) Bearing Failure and Recovery: Technical and Project Management Lessons Learned", NASA Technical Reports Server, Aug. 2011, 1 pg. Retrieved from the Internet: <http://ntrs.nasa.gov/search.jsp?R=20110015384>, Accessed on Sep. 29, 2015.

Harik, Elliot P. et al., "The International Space Station Solar Alpha Rotary Joint Anomaly Investigation", Proceedings of the 40th Aerospace Mechanisms Symposium, NASA Kennedy Space Center, May 2010, 20 pgs. Retrieved from the Internet: <http://ntrs.nasa.gov/archive/nasa/casi.ntrs.nasa.gov/20100003841.pdf>, Accessed on Sep. 29, 2015.

* cited by examiner

Primary Examiner — Matthew G Marini
(74) Attorney, Agent, or Firm — Kwan & Olynick LLP

(57) ABSTRACT

Systems, methods, and apparatus are disclosed for monitoring a performance of mechanical joints. Methods may include receiving, from a first plurality of sensors, a first plurality of measurements associated with a first mechanical joint included in the plurality of mechanical joints. The methods may also include generating, at a trend engine, at least one failure detection metric based on the first plurality of measurements. The failure detection metric may characterize a prediction of an operational failure associated with the first mechanical joint.

20 Claims, 5 Drawing Sheets

US 10,989,626 B2

SYSTEMS, METHODS, AND DEVICES FOR PERFORMANCE MONITORING OF MECHANICAL ASSEMBLIES

TECHNICAL FIELD

This disclosure generally relates to vehicles and machinery and, more specifically, to monitoring mechanical assemblies associated with such vehicles and machinery.

BACKGROUND

Mechanical assemblies included in various operational environments may often be utilized to mechanically couple different components with each other. For example, a mechanical joint may be used to couple a motor with another component that is to be moved by the motor. Accordingly, the motor may generate a mechanical force, which may be a rotational force, which is transferred to the other component via the mechanical joint. Such mechanical assemblies may be implemented in relatively extreme operational environments. For example, such mechanical assemblies may be implemented in operational environments in space, as may be found on a space station. In such a situation, maintenance and repair of one or more components of a mechanical assembly may be complicated and difficult, and conventional techniques are not able to effectively monitor mechanical assembly performance and predict the occurrence of failures. Accordingly, techniques for effectively monitoring a performance of such mechanical assemblies remain limited.

SUMMARY

Systems, method, and devices for manufacturing, using, and otherwise monitoring a performance of mechanical joints and generating failure detection metrics are disclosed herein. Methods may include receiving, from a first plurality of sensors, a first plurality of measurements associated with a first mechanical joint included in the plurality of mechanical joints. The methods may also include generating, at a trend engine, at least one failure detection metric based on the first plurality of measurements, where the failure detection metric characterizes a prediction of an operational failure associated with the first mechanical joint. In some embodiments, the first plurality of measurements characterizes at least one performance characteristic of the mechanical joint. In various embodiments, the trend engine is further configured to generate a plurality of performance data objects based on the first plurality of measurements, where each performance data object characterizes a statistical representation of at least some of the plurality of measurements over a designated period of time. In some embodiments, the at least one failure detection metric is generated based on at least one of the performance data objects.

In various embodiments, the failure detection metric includes a first set of data values characterizing a flag that identifies whether or not there is a predicted failure event, and the failure detection metric further includes a second set of data values characterizing a failure identifier that identifies a type of predicted failure event. In some embodiments, the trend engine is further configured to generate a maintenance report that includes a plurality of tasks associated with the predicted failure event. In various embodiments, the methods further include receiving, from a second plurality of sensors, a second plurality of measurements associated with a second mechanical joint included in the plurality of mechanical joints. In some embodiments, the failure detection metric is generated based on either the first plurality of measurements or the second plurality of measurements. In various embodiments, the first plurality of measurements characterizes a current draw of the first mechanical joint. In some embodiments, the first mechanical joint is a rotary joint implemented in a space station.

Also disclosed herein are systems for monitoring a performance of a plurality of mechanical joints. The systems may include a first plurality of sensors configured to obtain a first plurality of measurements from a first mechanical joint included in the plurality of mechanical joints. The systems may also include a trend engine configured to receive the first plurality of measurements from the first plurality of sensors, and further configured to generate at least one failure detection metric based on the first plurality of measurements, where the failure detection metric characterizes a prediction of an operational failure associated with the first mechanical joint.

In some embodiments, the first plurality of measurements characterizes at least one performance characteristic of the mechanical joint. In various embodiments, the trend engine is further configured to generate a plurality of performance data objects based on the first plurality of measurements, where each performance data object characterizes a statistical representation of at least some of the plurality of measurements over a designated period of time. In some embodiments, the at least one failure detection metric is generated based on at least one of the performance data objects. In particular embodiments, the failure detection metric includes a first set of data values characterizing a flag that identifies whether or not there is a predicted failure event, and the failure detection metric further includes a second set of data values characterizing a failure identifier that identifies a type of predicted failure event. In some embodiments, the trend engine is further configured to generate a maintenance report that includes a plurality of tasks associated with the predicted failure event.

Further disclosed herein are devices for monitoring a performance of a plurality of mechanical joints. The devices may include a first communications interface communicatively coupled to a first plurality of sensors. The first communications interface may be configured to receive a first plurality of measurements from the first plurality of sensors, where the first plurality of measurements is associated with a first mechanical joint included in the plurality of mechanical joints. The devices may further include a trend engine configured to receive the first plurality of measurements via the first communications interface, and further configured to generate at least one failure detection metric based on the first plurality of measurements. The failure detection metric may characterize a prediction of an operational failure associated with the first mechanical joint.

In some embodiments, the first plurality of measurements characterizes at least one performance characteristic of the mechanical joint. In various embodiments, the trend engine is further configured to generate a plurality of performance data objects based on the first plurality of measurements, where each performance data object characterizes a statistical representation of at least some of the plurality of measurements over a designated period of time. In some embodiments, the at least one failure detection metric is generated based on at least one of the performance data objects.

While numerous embodiments have been described to provide an understanding of the presented concepts, the previously described embodiments may be practiced without some or all of these specific details. In other instances, well known process operations have not been described in detail so as to not unnecessarily obscure the described concepts. While some concepts have been described in conjunction with the specific examples, it will be understood that these examples are not intended to be limiting, and other suitable examples are contemplated within the embodiments disclosed herein.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Mechanical assemblies may include various components of mechanical joints which may be used to couple various components with each other. Over time, such mechanical joints may fatigue and experience mechanical failures in one or more components, such as a motor or bearing assembly. The monitoring of such components may be difficult, especially when the mechanical assemblies are implemented at a great distance and in a relatively inaccessible operational environment, such as a space station. Moreover, the maintenance and repair of such components may be even more difficult. Because access to such operational environments may be limited due to a limited number of space flights and payload of each space flight, maintenance should be planned and performed as far in advance as possible. Some techniques are not able to effectively ensure operation of such mechanical assemblies because they are not able to identify and predict the occurrence of failure events and determine what maintenance should be performed to prevent such failure events.

Various embodiments are disclosed herein that receive measurements from components of mechanical assemblies and predict a potential future occurrence of a failure event within the mechanical assemblies. As will be discussed in greater detail below, the measurement data may be used to generate performance data. Various embodiments disclosed herein may analyze the performance data to identify features and characteristics of the performance data that are likely to predict an occurrence of a failure event. Accordingly, various embodiments disclosed herein may predict the occurrence of a failure event well in advance of the failure event actually occurring. Such advanced prediction/detection enables the implementation of a maintenance protocol in sufficient time to maintain/repair the mechanical assembly which may be in an extreme operational environment. Such maintenance/repairs may be accomplished before the predicted failure event actually occurs, thus enabling effective preventative maintenance of mechanical assemblies in extreme operational environments.

Figure 1:
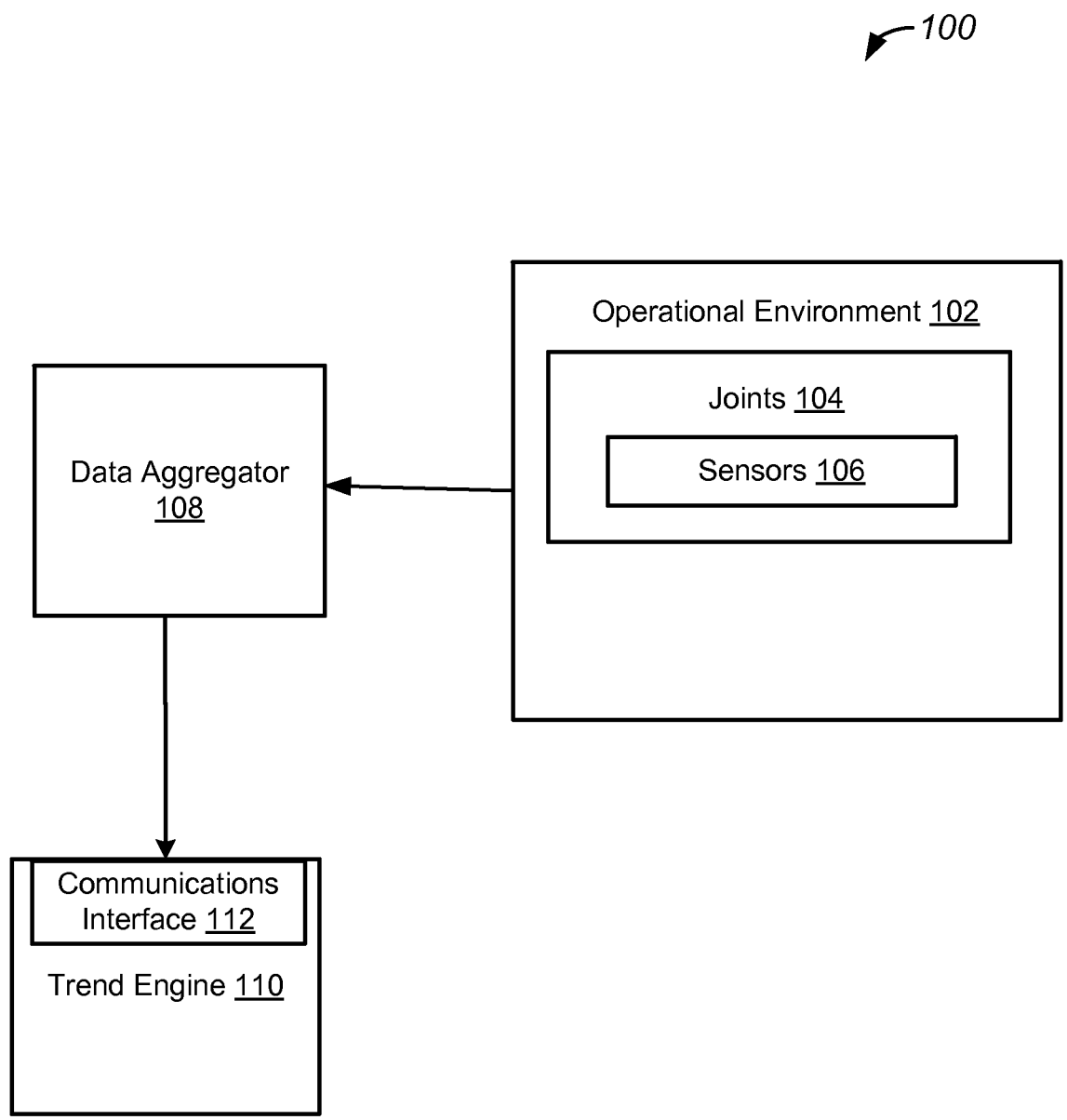
FIG. 1 illustrates a diagram of an example of a system for monitoring a performance of mechanical joints and generating failure detection metrics, configured in accordance with various embodiments.

FIG. 1 illustrates a diagram of an example of a system for monitoring a performance of mechanical joints and generating failure detection metrics, configured in accordance with various embodiments. In various embodiments, system 100 may include operational environment 102 which may be an environment in which one or more mechanical joints, discussed in greater detail below, may be implemented. For example, operational environment 102 may be included in a space station such as the International Space Station (ISS). Thus according to various embodiments, operational environment 102 may be implemented in extreme conditions, such as space, which may be difficult to access and monitor. Moreover, implementation of operational environment 102 in such extreme conditions may also complicate the implementation and management of maintenance for one or more components included in operational environment 102. As will be discussed in greater detail below, various components of system 100 may enable the efficient and effective implementation of such maintenance within operational environment 102.

As discussed above, operational environment 102 may include various mechanical joints, such as mechanical joints 104, as well as associated sensors, such as sensors 106. In various embodiments, mechanical joints 104 may rotary joints such as Solar Alpha Rotary Joints (SARJs) which may be a single-axis pointing device configured to orient or direct solar power generating arrays relative to the ISS. Accordingly, mechanical joints 104 may be configured to maintain a position of solar power generating arrays relative to the ISS such that the solar power generating arrays receive sufficient solar energy to generate electricity for the ISS. As will be discussed in greater detail below with reference to FIG. 2, operational environment 102 may include multiple mechanical joints which each control the orientation of a separate solar power generating array. For example, mechanical joints 104 may include a first mechanical joint and a second mechanical joint.

As previously discussed, operational environment 102 may also include sensors 106 which may be configured to obtain various measurements from mechanical joints 104. For example, sensors 106 may be electrical sensing devices which may be configured monitor and record various electrical properties associated with mechanical joints 104. For example, mechanical joints 104 may utilize electrical current to generate mechanical force that is transferred to the solar power generating arrays. Accordingly, as will be discussed in greater detail below, sensors 106 may be configured to measure a current draw of each of the mechanical joints included in mechanical joints 104. Such current measurements may include maximum amplitude measurements as well as slew current measurements. In various embodiments, sensors 106 may be further configured to implement any other suitable sensing modality. For example, sensors 106 may also be thermal sensors configured to measure temperatures associated with components implemented within operational environment 102, such as joints 104. In various embodiments, sensors 106 may be further configured to transmit measurements to one or more other components of system 100 which may be configured to generate failure detection metrics based on the measurements.

Accordingly, system 100 may include data aggregator 108 which may be configured to identify and retrieve measurements from sensors 106. In various embodiments, data aggregator 108 may be configured to periodically query sensors 106 and may receive measurements from sensors 106. Accordingly, data aggregator 108 may be configured to manage communications with sensors 106 and operational environment 102, as well as store, in a data storage system, all measurements provided by sensors 106. In some embodiments, data aggregator 108 may be implemented on Earth and outside of operational environment 102 thus enabling the generation of failure detection metrics, discussed in greater detail below, to be implemented in a different operational environment. In this way, measurements may be retrieved from sensors 106 and subsequently utilized in a different operational environment that is a terrestrial operational environment.

System 100 may further include trend engine 110 which may be configured to generate failure detection metrics based on the data stored by data aggregator 108. In various embodiments, the failure detection metric may characterize a prediction of an operational failure associated with at least one mechanical joint. Accordingly, the failure detection metric may characterize a specific failure associated with joints 104 and may also estimate a temporal constraint associated with the operational failure. For example, the failure detection metric may identify a particular mechanical failure of a particular component included in a joint of joints 104. The failure detection metric may further identify an estimate of a time period within which the failure is predicted to occur. Further still, the failure detection metric may also identify a probability associated with the identified failure and estimate of time period. In some embodiments, such a probability may characterize a confidence interval associated with each of the identified failures and estimated time periods. In this way, trend engine 110 may analyze various performance data and telemetry data received, at least in part, from sensors 106, and may generate operational failure metrics which identify any future operational failures that may occur as well as estimates of time periods associated with those operational failures. Additional details of the generation of such failure detection metrics are discussed in greater detail below with reference to FIGS. 3 and 4.

In some embodiments, trend engine 110 as well as data aggregator 108 may be implemented utilizing, at least in part, a data processing system, such as data processing system 500, discussed in greater detail below with reference to FIG. 5. In various embodiments, trend engine 110 as well as data aggregator 108 may include one or more processing devices configured to generate failure detection metrics based on data received from various data sources, such as sensors 106. In some embodiments, trend engine 110 may include one or more communications interfaces, such as communications interface 112, which may be configured to receive measurement data. Furthermore, as similarly stated above, trend engine 110 may include one or more processing devices specifically configured to process data associated with mechanical joints 104 implemented within operational environment 102. In one example, trend engine 110 may include several processing nodes, specifically configured to handle processing operations on large data sets. In one specific embodiment, trend engine 110 may include one or more application specific processors implemented in application specific integrated circuits (ASICs) that may be specifically configured to process large amounts of data in complex data sets, as may be found in the context referred to as "big data."

In some embodiments, the one or more processors may be implemented in one or more reprogrammable logic devices, such as a field-programmable gate array (FPGAs), which may also be similarly configured. According to various embodiments, trend engine 110 may be implemented as a hardware controller. Moreover, trend engine 110 may be configured to include one or more dedicated processing units that include one or more hardware accelerators configured to perform pipelined data processing operations. For example, as discussed in greater detail below, operations associated with the generation of failure detection metrics may be handled, at least in part, by one or more hardware accelerators included in data aggregator 108 and trend engine 110, respectively.

Figure 2:
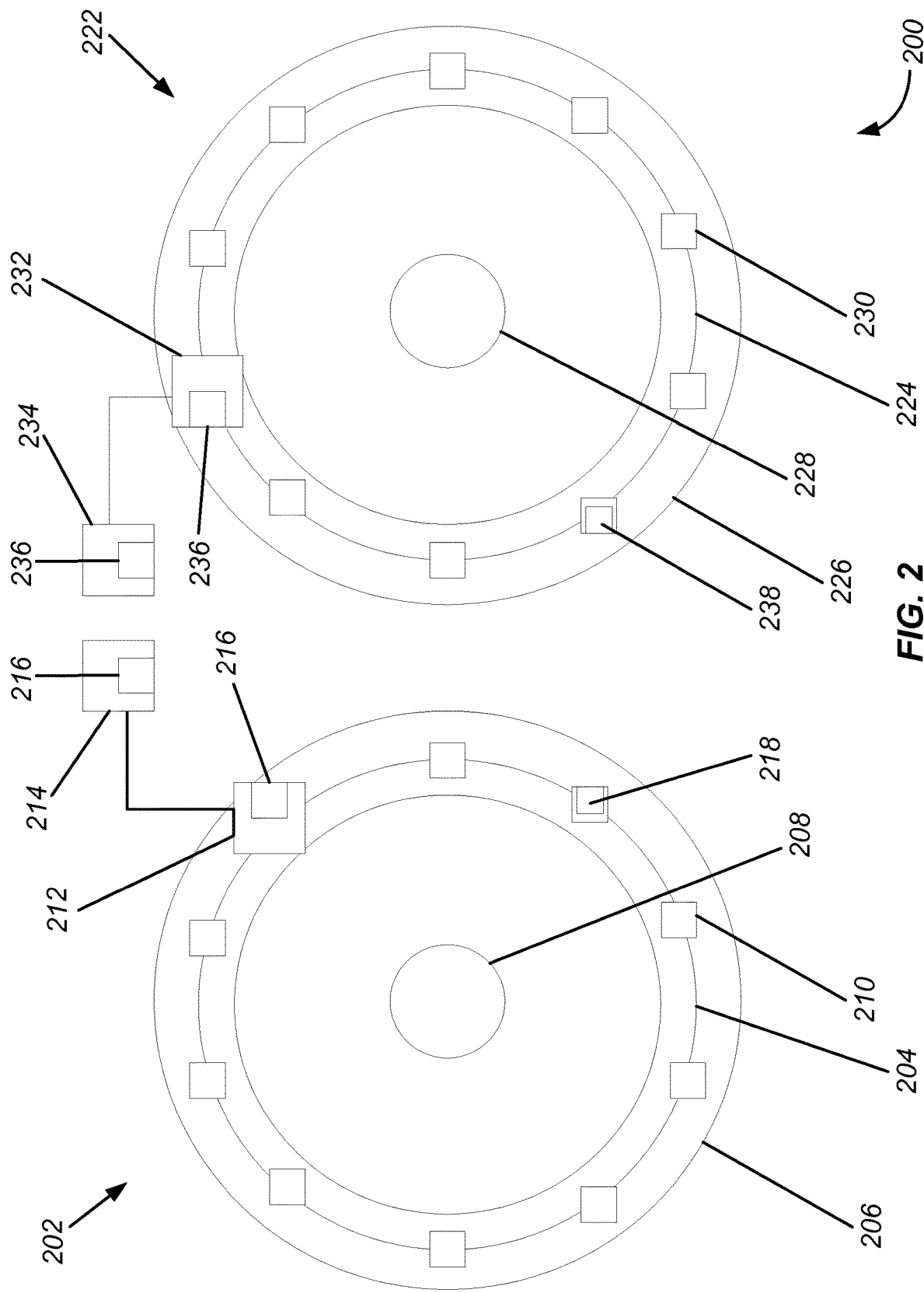
FIG. 2 illustrates a diagram of an example of one or more mechanical joints that may provide the basis for generating failure detection metrics, configured in accordance with various embodiments.

FIG. 2 illustrates a diagram of an example of one or more mechanical joints that may provide the basis for generating failure detection metrics, configured in accordance with various embodiments. In various embodiments, system 200 may be implemented within operational environment 102 discussed above. Accordingly, system 200 may include mechanical joints 104, which may include port mechanical joint 202 and starboard mechanical joint 222. As discussed above, port mechanical joint 202 may be mechanically coupled to a solar power generating array and may be configured to control an orientation of the solar power generating array relative to system 200, operational environment 102, and a space station in which operational environment 102 may be implemented. In various embodiments, port mechanical joint 202 may include various electrical and mechanical components which may be configured to enable such movement and orientation of the solar power generating array. For example, port mechanical joint 202 may be configured to include two concentric rings such as inboard ring 204 and outboard ring 206. In various embodiments, inboard ring 204 may be configured to be mechanically coupled to an external component, such as a solar power generating array, and may be configured to transfer a mechanical rotational force to the solar power generating array. In some embodiments, another component, such as transfer assembly 208, may be configured to transfer electrical power and/or data across the rotating joint. For example, transfer assembly 208 may include a rotatable cylinder or collar through which electrical power and data signals may traverse. Thus, transfer assembly 208 may provide rotatable coupling between electrical components within operational environment 102 and the solar power generating array.

In various embodiments, inboard ring 204 may be coupled to outboard ring 206 via various bearing assemblies and a motor. For example, bearing assemblies, such as bearing assembly 210, may be mounted to outboard ring 206 and may include several rollers which may contact a surface of inboard ring thus providing mechanical coupling and support between inboard ring 204 and outboard ring 206 while allowing free rotation of inboard ring 204. In various embodiments, motor 212 may also be mounted to outboard ring 206 and coupled to inboard ring 204. For example, motor 212 may be mounted on outboard ring 206 and may include one or more geared wheels that contact a geared or toothed surface of inboard ring 204. In this way, motor 212 may utilize mechanical force to turn inboard ring 204. In various embodiments, motor 212 may be controlled by motor controller 214 which may be configured to implement one or more operational protocols to properly orient the solar power generating array. Accordingly, motor controller 214 may be configured to rotate the solar power generating array a designated rotational distance for a particular period of time to ensure that the solar power generating array continues to face the sun despite movement of the space station.

As discussed above, port mechanical joint 202 may also include at least some of sensors 106. For example, port mechanical joint 202 may include sensors 216 which may be configured to measure electrical performance characteristics of port mechanical joint 202. In some embodiments, sensors 216 may be implemented within or coupled to motor 212 or motor controller 214, and may be configured to measure aspects of a current utilized to move motor 212. As previously discussed, such measurements may be provided to another system component, such as data aggregator 108 and trend engine 110. In various embodiments, sensors may be implemented in other components of port mechanical joint 202. For example, sensors 218 may be implemented in bearing assemblies 210.

As shown in FIG. 2, system 200 may also include starboard mechanical joint 220. As similarly discussed above, starboard mechanical joint 220 may include inboard ring 224 which may be coupled to outboard ring 226 via bearing assemblies 230 and motor 232. Moreover, inboard ring 224 may be mechanically coupled to another solar power generating array, and electrical and/or data coupling with the solar power generating array may be provided by transfer assembly 228. As previously discussed, motor 232 may be controlled by motor controller 234. Moreover, starboard mechanical joint 220 may also include sensors 236 and sensors 238 which may be implemented similarly to sensors 216 and 218 discussed above.

Figure 3:
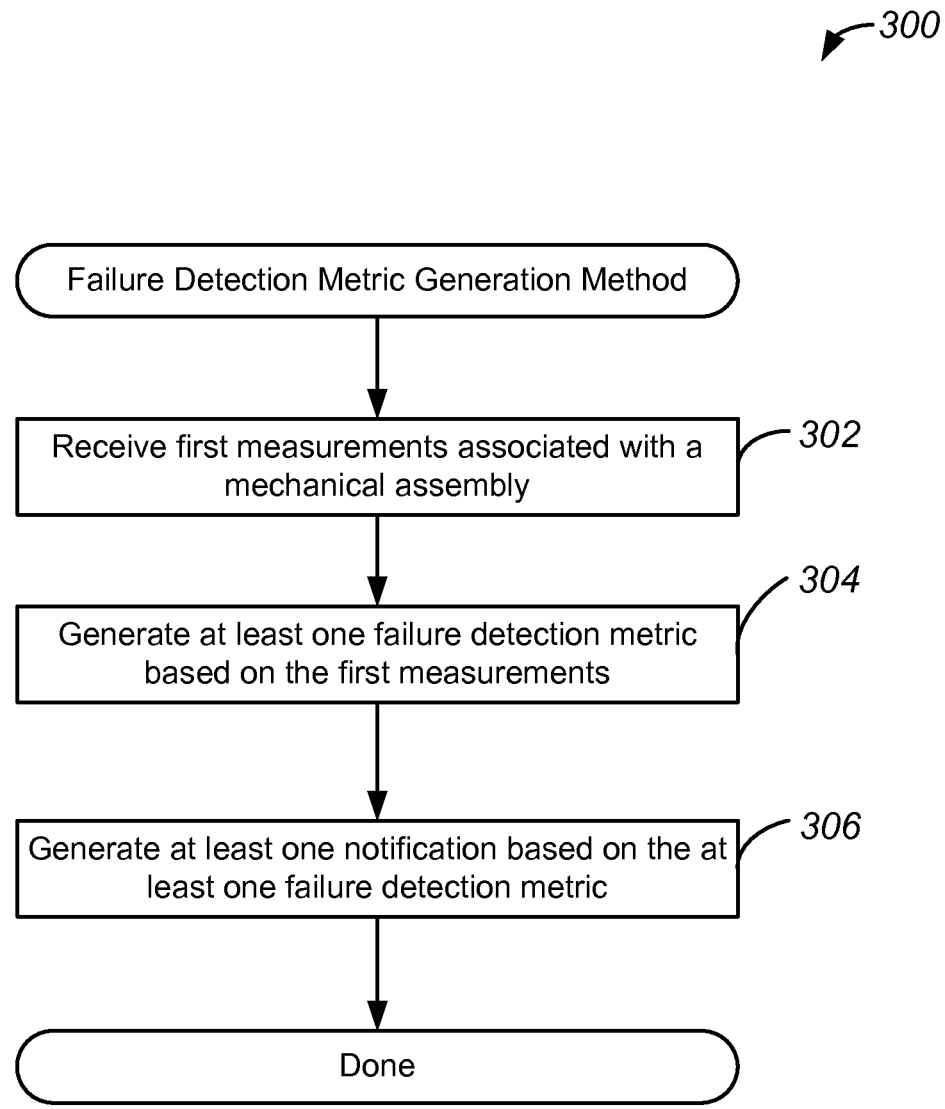
FIG. 3 illustrates a flow chart of an example of a method for monitoring a performance of mechanical joints and generating failure detection metrics, implemented in accordance with various embodiments.

FIG. 3 illustrates a flow chart of an example of a method for monitoring a performance of mechanical joints and generating failure detection metrics, implemented in accordance with various embodiments. As disclosed herein, measurement data may be used to identify potential operational failures that may occur well before they actually occur. Thus, measurement data associated with various different components of an operational environment may be monitored. As will be discussed in greater detail below, various features and characteristics of the measurement data may be analyzed to identify potential operational failures and generate recommendations for preventing such operational failures.

Accordingly, method 300 may commence with operation 302 during which first measurements may be received. As previously discussed, the first measurements may be associated with a mechanical assembly, such as the at least one mechanical joint. Accordingly, the first measurements may characterize a current draw associated with the mechanical joint. For example, the first measurements may identify maximum current draws at particular points in time as well as current slew rates. As previously discussed, the first measurements may be made periodically and transmitted to various other system components such as data aggregator 108 and/or trend engine 110.

Method 300 may proceed to operation 304 during which at least one failure detection metric may be generated based on the first plurality of measurements. As will be discussed in greater detail below with reference to FIG. 4, the failure detection metric may characterize a prediction of an operational failure associated with the at least one mechanical joint. Accordingly, a system component, such as trend engine 110, may analyze the measurement to identify various conditions indicative of an imminent mechanical failure. In response to identifying such conditions, trend engine 110 may generate a failure detection metric which may identify a type of mechanical failure that will occur, a time in which it will occur, as well as an estimate of an accuracy of the identified mechanical failure and estimate of time period.

Method 300 may proceed to operation 306 during which at least one notification may be generated based on the at least one failure detection metric. In some embodiments, the notification may be represent a particular event such as a threshold crossing. For example, if a particular current draw metric or threshold is exceeded, a notification may be generated and provided to an engineer as an electronic message. Moreover, as will be discussed in greater detail below with reference to FIG. 4, trend engine 110 may also generate a maintenance recommendation data object which may include data values characterizing a recommended course of action that may be taken to prevent or repair the identified type of mechanical failure. For example, for a given identified mechanical failure, the maintenance recommendation data object may identify several tasks that need to be performed as well as a time table associated with those tasks. In this way, potential mechanical failures may be identified well in advance, and preventative measures may be taken to ensure that they are prevented or mitigated.

Figure 4:
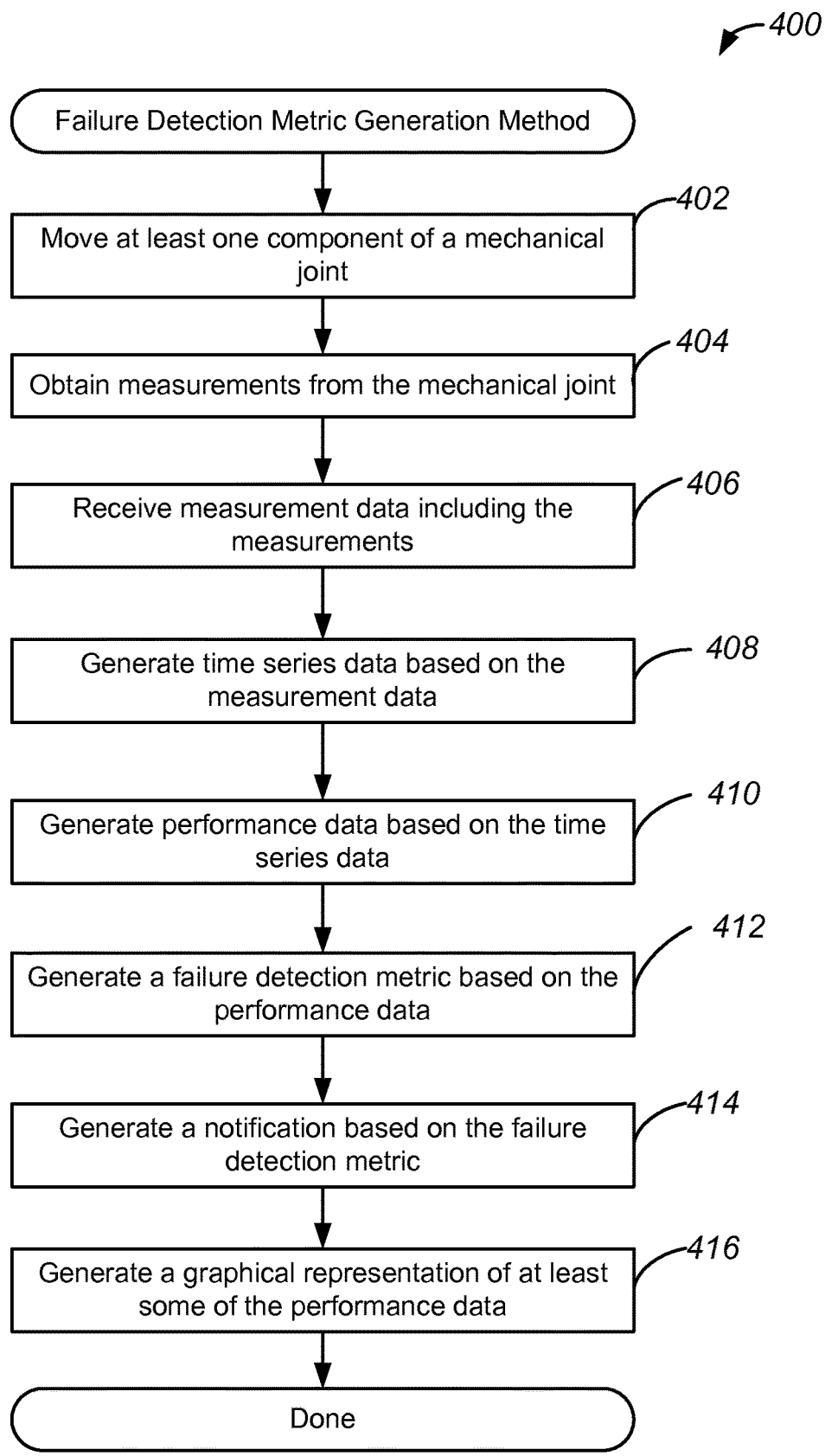
FIG. 4 illustrates a flow chart of another example of a method for monitoring a performance of mechanical joints and generating failure detection metrics, implemented in accordance with various embodiments.

FIG. 4 illustrates a flow chart of another example of a method for monitoring a performance of mechanical joints and generating failure detection metrics, implemented in accordance with various embodiments. As discussed above, measurement data associated with various different components of an operational environment may be monitored, and various features and characteristics of the measurement data may be analyzed to identify potential operational failures and generate recommendations for preventing such operational failures.

Method 400 may commence with operation 402 during which a mechanical joint may be moved. As discussed above, a mechanical joint may be included in joints 104 and may be configured to move and orient a solar power generating array. Such movements may be performed numerous times over the course of a day, and over weeks, months, and even years. Accordingly, joints 104 may be moved periodically as part of the routine operation of operational environment 102 which, as previously discussed, may be a space station.

Method 400 may proceed to operation 404 during which measurements may be made. As similarly discussed above, sensors 106 may obtain measurements generated based on electrical and mechanical performance characteristics of joints 104. For example, measurements may be made by periodically measuring a current drawn or utilized by one or more components of joints 104, such as motor 212 and/or motor 232. In various embodiments, the measurements may be stored as measurement data that may include data objects or data tables configured to store the measurements as well as any associated relevant data. For example, a measurement data object may include a first data field configured to store an identifier that identifies a type of measurement, such as current draw. The measurement data object may include a second data field configured to store a measurement value which may be the actual measured current. The measurement data object may also include a third data field configured to store associated metadata, such as a timestamp identifying when the measurement was made. Such measurement data may be stored locally in a data storage device implemented in operational environment 102. Alternatively, such measurement data may be streamed to one or more other system components, such as data aggregator 108.

Accordingly, method 400 may proceed to operation 406 during which the measurement data may be received at a system component. As discussed above, such measurement data may be received at data aggregator 108. Accordingly, data aggregator 108 may query a local data store that may be implemented in operational environment 102 to periodically download sets of measurement data. In some embodiments, such measurement data may be provided to data aggregator 108 as a stream of data. In this way, data aggregator 108 may receive all relevant measurement data associated with joints 104. Moreover, in some embodiments, data aggregator 108 may also retrieve environmental data. Thus, according to some embodiments, data aggregator 108 may be configured to query an external data source which may be a data storage system or a database system operated and maintained by a third party entity. The external data source may include environmental data characterizing various environmental conditions over a period of time. For example, the external data source may include a database of solar activity over the last several years as well as thermal activity. Accordingly, data aggregator 108 may be configured to query the external data source and retrieve environmental data characterizing such solar activity. Moreover, the query executed by data aggregator 108 may be configured based on the measurement data. For example, data aggregator 108 may constrain the query of environmental data based on a time frame for which measurement data is available or being analyzed. In this way, the retrieved environmental data may correspond to the time period for which measurement data is being analyzed. In some embodiments, data aggregator 108 may be further configured to merge the measurement data and the environmental data into a single data set based on a particular feature or characteristic, such as timestamp.

Method 400 may proceed to operation 408 during which time series data may be generated based on the measurement data. In various embodiments, the measurement data may be received intermittently and as several different data objects that may even be in different formats. Accordingly, during operation 408, a system component, such as trend engine 110, may be configured to combine the measurement data into one or more time series that may be stored as time series data. Accordingly, the time series data may characterize a comprehensive representation of a particular measurement for a particular component over the lifetime of that component. For example, measurement data characterizing a maximum current used by a particular joint may be merged into a single time series data object that characterizes the joint's current usage over a time period that extends as far into the past as possible based on the available data. Accordingly, such a time series may extend several years into the past and provide a comprehensive view of the current usage of the join during its entire operational lifetime. Such time series data objects may be generated for each different measurement for which data is available.

Furthermore, according to some embodiments, the measurement data may be modified prior to being stored in the time series data. In various embodiments, the measurement data may be modified based on one or more properties of the component that has been measured. In one example, a motor, such as motor 212, may be a two phase motor that utilizes a two phase power supply. In this example, the current measurement data associated with the two phase motor may be modified to convert the measurement data to a single root mean square (RMS) current signal. In this way, measurement data associated with a motor having any number of phases may be modified to generate a single measurement time series associated with that motor.

Moreover, the measurement data may also be modified based on other measurement data as well. In various embodiments, current measurement data associated with a motor may be modified based on thermal measurement data associated with that same motor. In one example, the thermal measurement data may provide an offset value or adjustment value by which the current measurement data may be modified. In this way, the current measurement data may be modified to compensate or control for one or more environmental factors that may have affected the measurements underlying the current measurement data or the operation of the component associated with the current measurement data, which may be one of joint 104. Similarly, the measurement data may be modified based on environmental data as well. For example, an offset or modifier may be determined based on solar activity identified by the environmental data, thus compensating for variances in solar activity and radiation.

Method 400 may proceed to operation 410 during which performance data may be generated based on the time series data. In various embodiments, the performance data may be data that characterizes one or more features or characteristics of a performance of a component over a designated period of time. Accordingly, a performance data object may characterize an average maximum current used by one of joints 104 over a period of time which may be a month. In another example, a performance data object may characterize an average temperature experienced by bearing assemblies 210 during a particular week. In this way, the performance data objects may be configured to provide different views of the time series data by representing different levels of temporal granularity, as well as including different mathematical representations of the underlying measurement data.

More specifically, the performance data objects may be generated for numerous different period of time. In some embodiments, the periods of time may be predetermined and stored in a configurable data table accessible by trend engine 110. In various embodiments, periods of time may be selected from a group that includes minutes, days, weeks, months, and years. As will be discussed in greater detail below, performance data objects may be generated for any or all of the different time periods. In this way, numerous different representations of the time series data may be generated that have different levels of temporal granularity. Furthermore, additional performance data may be generated based on combinations of performance data objects. For example, data values for numerous different performance data objects associated with different days may be averaged. In this way, an average or baseline value may also be stored in the performance data. Alternatively, a performance data object having a larger time period may be used as a base line. For example, a performance data object including data averaged over a month may be utilized as a baseline for a performance data object including data averaged over a day that falls at the end of that same month.

Moreover, the measurement data included in each of the time period specific performance data object may be configured to represent the underlying measurement data using any one of numerous different statistical measures. For example, for measurement data included in each time period, trend engine 110 may calculate an average, minimum, maximum, median, and/or rate of change. In this way, the performance data may also be configured to provide various different statistical measures of the underlying measurement data.

In various embodiments, the performance data may be generated periodically. Accordingly, trend engine 110 may be configured to periodically analyze the time series data and generate the performance data. In some embodiments, the performance data may be generated dynamically. Thus, trend engine 110 may be configured to generate the performance data in response to a particular condition or input that may be received at system 100. For example, an input may be received from a user, who may be an engineer, who has submitted a request for an analysis of the measurement data. Accordingly, in response to receiving such an input, trend engine 110 may generate the performance data and implement one or more other operations as discussed in greater detail below.

Accordingly, method 400 may proceed to operation 412 during which a failure detection metric may be generated based on the performance data. In various embodiments, the failure detection metric may include one or more data values that identify whether or not a predicted failure has been identified based on the performance data, and further identify features or characteristics of the failure if one has been predicted. For example, the failure detection metric may include a flag which identifies whether or not a failure has been predicted, and may further include one or more identifiers that identify or characterize an identity of the predicted failure as well as one or more associated conditions, such as a component identity and an estimated time of failure. Furthermore, a system component, such as trend engine 110, may be configured to analyze performance data from multiple different joints 104 to generate failure detection metrics across numerous different joints 104.

In various embodiments, the failure detection metric may be generated based on one or more designated values. According to some embodiments, the performance data may be compared with one or more designated values which may include one or more threshold values. In various embodiments, such threshold values may have been previously determined based on historical data characterizing past instances of hardware failures, and/or may have been determined based on an input received from a user, such as an engineer. Accordingly, one or more data values included in the performance data may be compared with the threshold values to determine if a failure is predicted to occur. For example, an average current draw of a motor may be represented in a performance data object and may be compared to a threshold value. If the average current draw exceeds the threshold value, a failure may be predicted to occur. In this example, a failure detection metric may be generated that includes a flag identifying the prediction of a failure, and further includes a failure identifier that identifies the component with which the predicted failure is associated which, in this example, may be the motor.

Further still, a system component, such as trend engine 110, may be configured to generate an estimate of period of time associated with the predicted failure. In some embodiments, trend engine 110 may query, using the failure identifier, a data storage system that may be configured to store maintenance data associated with operational environment 102. In various embodiments, the maintenance data stored in the data storage system may include historical data characterizing previous instances of failures as well as previously generated performance data associated with those failures. In some embodiments, a result object may be returned that includes data values characterizing a similar failure that may have occurred previously as well as previous performance data associated with that previous failure. In various embodiments, trend engine 110 may be configured to analyze the result object to determine approximately how much time elapsed between the condition underlying the failure detection metric, which may be a threshold crossing, and the actual failure itself. Based on this determination, trend engine 110 may generate an estimate of a time period.

In some embodiments, trend engine 110 may generate the estimate of a time period based on trends in the performance data itself. For example, in response to detecting a condition underlying the failure detection metric, such as a threshold crossing, trend engine 110 may be configured to utilize past performance data to generate a forecast of future behavior of a component as well as a prediction of a failure event. For example, a performance data object may include data values representing an average current drawn by a motor over a period of day. Trend engine 110 may determine that the average current draw represented in the performance data object exceeds a threshold value. Trend engine 110 may then retrieve performance data for the past two weeks, relative to the day associated with the performance data object, and may implement one or more statistical operations to fit a line or curve to the measured current data. Trend engine 110 may be configured to generate a plot of the current data which estimates future current measurements based on the fitted line or curve. Trend engine 110 may be further configured to compare the plotted line with one or more other conditions to estimate the occurrence of a failure event. For example, trend engine 110 may be configured to determine when an amplitude of the current draw represented by the plotted line exceeds a particular threshold that represents a maximum current allowed by the circuitry of the motor. When the current draw is predicted to exceed a maximum current allowed by the motor itself, a future failure may be identified.

In various embodiments, various combinations of designated values may be utilized. For example, the comparison may involve a combination of an average current draw from a motor as well as an average resistance of a bearing assembly, where each of the average values is compared against separate threshold values. Accordingly, any combination of measurements and their respective representations in performance data object may be used to generate the failure detection metric.

In some embodiments, the failure detection metric may be generated based on rates of change associated with the performance data. As previously discussed, the performance data may include rates of change in a particular measured value. Accordingly, trend engine 110 may be configured to identify rates of change that may be indicative of an imminent operational failure. For example, trend engine 110 may compare a rate of change included in a performance data object with a designated rate threshold. If the measured rate is greater than the rate threshold, a failure may be predicted. As similarly discussed above, failure identifiers may be identified based on a comparison with previously generated and stored maintenance data. In this way, trend engine 110 may be configured to identify rates of change in measured values that may be problematic, and may be further configured to generate failure detection metrics in response to identifying such problematic rates.

According to various embodiments, the failure detection metric may be generated based on patterns detected within the performance data. Accordingly, trend engine 110 may be configured to implement pattern recognition to identify patterns of measurement data that are indicative of an imminent failure. For example, trend engine 110 may be configured to identify oscillations in the measurement data that have an amplitude that is greater than a designated threshold value, and that extend for at least a designated period of time. As similarly discussed above, failure identifiers may be identified based on a comparison with previously generated and stored maintenance data. In this way, trend engine 110 may be configured to identify patterns in the measurement data and/or performance data, and may be further configured to generate failure detection metrics in response to identifying such patterns.

Method 400 may proceed to operation 414 during which a notification may be generated based on the failure detection metric. In various embodiments, the notification may be generated based on the previously described analysis of the performance data. Accordingly, if a failure detection metric is generated and/or a particular representation of the performance data meets one or more conditions, a notification may be generated. In one example, if an average maximum current draw exceeds a particular threshold value, a notification may be generated. In another example, if a rate of increase in current draw exceeds a particular amount, the notification may be generated. In various embodiments, the notification generated may include one or more data values characterizing the conditions underlying the generation of the notification as well as the performance data underlying the notification. For example, the notification may identify a type of event detected or a threshold that has been crossed as well as the measured performance data underlying the detected event or threshold crossing.

In some embodiments, the notification may identify a deviation from a designated condition or state. For example, a first operational state may be defined by an average or baseline measurement and may be assigned an identifier, such as "nominal." In this example, if a measurement, such as current draw, included in the performance data deviates by a designated amount, a notification may be generated. Thus, if current draw identified by the performance data increases by a designated amount, such as 10%, a second operational state may be identified as "above nominal" and a notification may be generated that identifies the change in operational state as well as the performance data underlying the change in operational state.

Moreover, as discussed above, the notification may also be a recommendation, such as a recommendation data object. In various embodiments, the recommendation data object may be generated based on a comparison of a failure identifier with a data table stored in a data storage system. In various embodiments, the data table may also be included in maintenance data stored in the data storage system. In some embodiments, the failure identifier may for the basis of a query executed on the data table. Accordingly, contents of the data table may be queried and if a match is found, a corresponding entry may be returned as a result object. In one example, the corresponding entry may include various different tasks associated with the identified failure. The tasks may have been previously identified and generated based on historical data characterizing previous repair and maintenance operations as well as input received from a user, such as an engineer. For example, in response to a failure identifier identifying a failure with motor 212, the data table may be queried, and a result object may be returned that includes several tasks that may be implemented to prevent failure of motor 212. For example, the tasks may include a test protocol that may be implemented to obtain additional measurement data as well as a protocol for replacing motor 212 to mitigate consequences of an operational failure in the future.

Method 400 may proceed to operation 416 during which a graphical representation of the performance data may be generated. In various embodiments, trend engine 110 may be further configured to generate a graphical data object that is configured to be capable of being displayed in a display device of a data processing system. In various embodiments, the graphical representation may include a graph having time plotted on an X axis as well as an aspect of the performance data plotted on a Y axis. For example, average current draw may be plotted on the Y axis over time, which may be represented on the X axis. In various embodiments, trend engine 110 may be further configured to display various other data plots as well. For example, the graphical representation may include plots of other types of performance data, such as average rate of change, as well as other types of data, such as environmental data. Accordingly, the graphical representation may simultaneously plot numerous different types of performance data as well as associated data such as environmental data which may characterize environmental phenomena such as solar activity.

Figure 5:
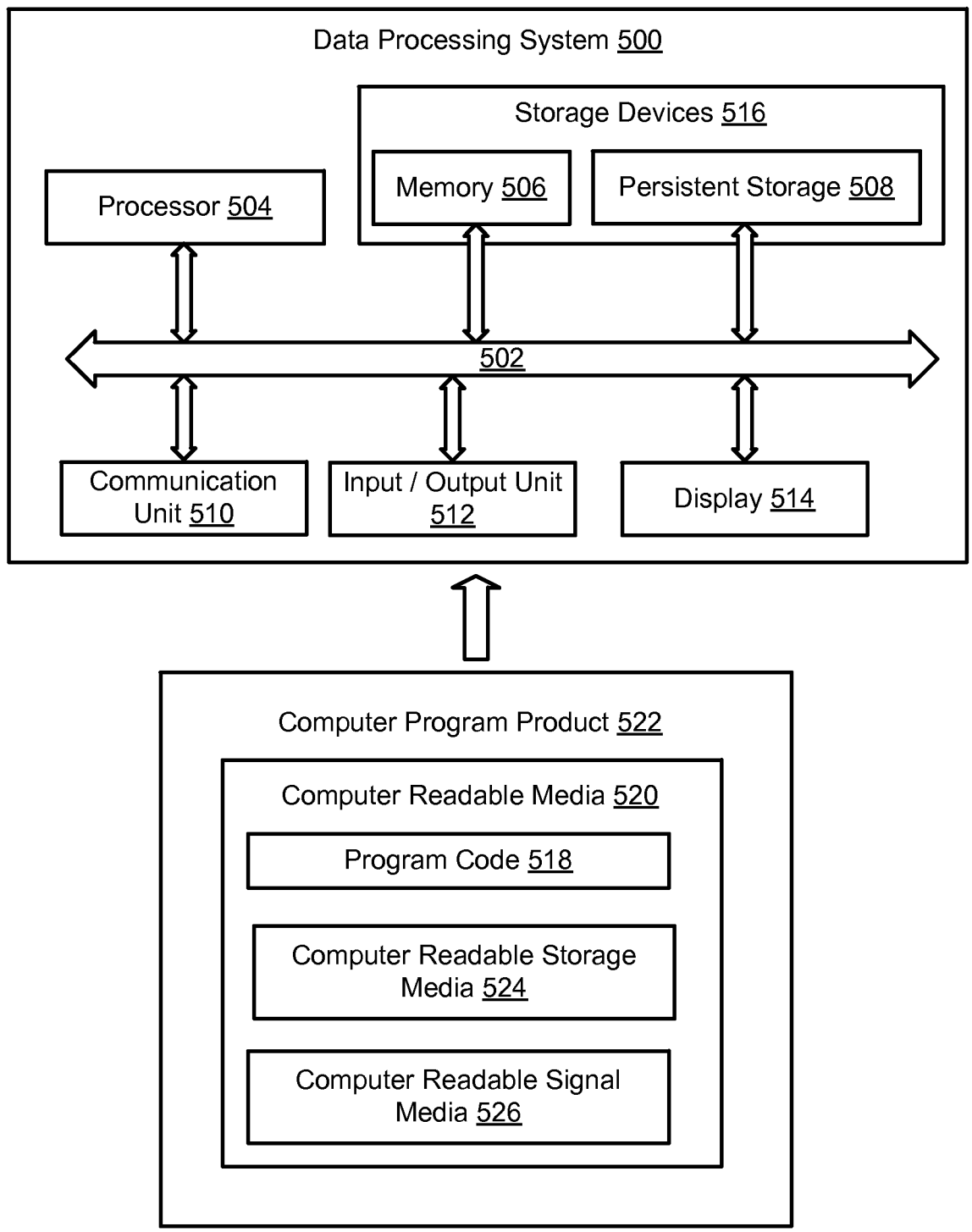
FIG. 5 illustrates a data processing system configured in accordance with some embodiments.

FIG. 5 illustrates a data processing system configured in accordance with some embodiments. Data processing system 500, also referred to herein as a computer system, may be used to implement one or more computers or processing devices used in a controller, server, or other components of systems described above. In some embodiments, data processing system 500 includes communications framework 502, which provides communications between processor unit 504, memory 506, persistent storage 508, communications unit 510, input/output (I/O) unit 512, and display 514. In this example, communications framework 502 may take the form of a bus system.

Processor unit 504 serves to execute instructions for software that may be loaded into memory 506. Processor unit 504 may be a number of processors, as may be included in a multi-processor core. In various embodiments, processor unit 504 is specifically configured to process large amounts of data that may be involved when generating performance data and recommendation data objects, as discussed above. Thus, processor unit 504 may be an application specific processor that may be implemented as one or more application specific integrated circuits (ASICs) within a processing system. Such specific configuration of processor unit 504 may provide increased efficiency when processing the large amounts of data involved with the previously described systems, devices, and methods. Moreover, in some embodiments, processor unit 504 may include one or more reprogrammable logic devices, such as field-programmable gate arrays (FPGAs), that may be programmed or specifically configured to optimally perform the previously described processing operations in the context of large and complex data sets associated with measurement data described above.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these illustrative examples. Memory 506, in these examples, may be, for example, a random access memory or any other suitable volatile or non-volatile storage device. Persistent storage 508 may take various forms, depending on the particular implementation. For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these illustrative examples, provides for communications with other data processing systems or devices. In these illustrative examples, communications unit 510 is a network interface card.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications framework 502. The processes of the different embodiments may be performed by processor unit 504 using computer-implemented instructions, which may be located in a memory, such as memory 506.

These instructions are referred to as program code, computer usable program code, or computer readable program code that may be read and executed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for execution by processor unit 504. Program code 518 and computer readable media 520 form computer program product 522 in these illustrative examples. In one example, computer readable media 520 may be computer readable storage media 524 or computer readable signal media 526.

In these illustrative examples, computer readable storage media 524 is a physical or tangible storage device used to store program code 518 rather than a medium that propagates or transmits program code 518.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for data processing system 500 are not meant to provide architectural limitations to the manner in which different embodiments may be implemented. The different illustrative embodiments may be implemented in a data processing system including components in addition to and/or in place of those illustrated for data processing system 500. Other components shown in FIG. 5 can be varied from the illustrative examples shown. The different embodiments may be implemented using any hardware device or system capable of running program code 518.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for monitoring a performance of a plurality of mechanical joints, the method comprising:
   receiving, from a first plurality of sensors, a first plurality of measurements included in a plurality of data objects, the plurality of measurements being obtained from at least a first mechanical joint, the first mechanical joint being one of the plurality of mechanical joints, the first plurality of measurements comprising current measurements made by the first plurality of sensors included in at least one motor included in the first mechanical joint and a plurality of bearing assemblies included in the first mechanical joint, wherein each of the plurality of bearing assemblies contacts an inboard ring and an outboard ring of the first mechanical joint;
   retrieving environmental data corresponding to a time period associated with the first plurality of measurements, the environmental data representing environmental conditions over the period of time;
   modifying the current measurements included in the first plurality of measurements, the modifying compensating for one or more environmental conditions identified by the environmental data, the one or more environmental conditions comprising solar activity experienced by the first mechanical joint;
   generating time series data for the first mechanical joint by merging the plurality of data objects into a single time series data object;
   generating, at a trend engine, at least one failure detection metric and an estimated time of failure based on performance data of the at least one motor and the plurality of bearing assemblies, the performance data being included in the first plurality of measurements, the failure detection metric characterizing a prediction of an operational failure event associated with the first mechanical joint, and the generating of the at least at least one failure detection metric being based, at least in part, on identifying a threshold crossing based on the performance data; and
   generating one or more tasks to prevent the operational failure event of the first mechanical joint, the one or more tasks identified based on the at least one failure detection metric.

2. The method of claim 1, wherein the first plurality of measurements characterizes at least one performance characteristic of the mechanical joint.

3. The method of claim 1, wherein the trend engine is further configured to generate a plurality of performance data objects based on the first plurality of measurements, wherein each performance data object characterizes a statistical representation of at least some of the plurality of measurements over a designated period of time.

4. The method of claim 3, wherein the at least one failure detection metric is generated based on at least one of the performance data objects.

5. The method of claim 1, wherein the failure detection metric includes a first set of data values characterizing a flag that identifies whether or not there is a predicted failure event, and wherein the failure detection metric further includes a second set of data values characterizing a failure identifier that identifies a type of predicted failure event.

6. The method of claim 5, wherein the trend engine is further configured to generate a maintenance report that includes a plurality of tasks associated with the predicted failure event.

7. The method of claim 1 further comprising:
receiving, from a second plurality of sensors, a second plurality of measurements associated with a second mechanical joint included in the plurality of mechanical joints.

8. The method of claim 7, wherein the failure detection metric is generated based on either the first plurality of measurements or the second plurality of measurements.

9. The method of claim 1 wherein, the first plurality of measurements characterize a current draw of the first mechanical joint.

10. The method of claim 9, wherein the first mechanical joint is a rotary joint implemented in a space station.

11. A system for monitoring a performance of a plurality of mechanical joints, the system comprising:
a first plurality of sensors configured to obtain a first plurality of measurements included in a plurality of data objects, the first plurality of measurements being received from a first mechanical joint, the first mechanical joint being one of the plurality of mechanical joints, the first plurality of measurements comprising current measurements made by the first plurality of sensors included in at least one motor included in the first mechanical joint and a plurality of bearing assemblies included in the first mechanical joint, wherein each of the plurality of bearing assemblies contacts an inboard ring and an outboard ring of the first mechanical joint; and
a trend engine configured to:
receive the first plurality of measurements from the first plurality of sensors,
retrieve environmental data corresponding to a time period associated with the first plurality of measurements, the environmental data representing environmental conditions over the period of time,
modify the current measurements included in the first plurality of measurements, the modifying compensating for one or more environmental conditions identified by the environmental data, the one or more environmental conditions comprising solar activity experienced by the first mechanical joint;
generate time series data for the first mechanical joint by merging the plurality of data objects into a single time series data object;
generate at least one failure detection metric and an estimated time of failure based on performance data of the at least one motor and the plurality of bearing assemblies, the performance data being included in the first plurality of measurements, the failure detection metric characterizing a prediction of an operational failure event associated with the first mechanical joint, and the generating of the at least at least one failure detection metric being based, at least in part, on identifying a threshold crossing based on the performance data, and
generate one or more tasks to prevent the operational failure event of the first mechanical joint, the one or more tasks identified based on the at least one failure detection metric.

12. The system of claim 11, wherein the first plurality of measurements characterizes at least one performance characteristic of the mechanical joint.

13. The system of claim 11, wherein the trend engine is further configured to generate a plurality of performance data objects based on the first plurality of measurements, wherein each performance data object characterizes a statistical representation of at least some of the plurality of measurements over a designated period of time.

14. The system of claim 13, wherein the at least one failure detection metric is generated based on at least one of the performance data objects.

15. The system of claim 11, wherein the failure detection metric includes a first set of data values characterizing a flag that identifies whether or not there is a predicted failure event, and wherein the failure detection metric further includes a second set of data values characterizing a failure identifier that identifies a type of predicted failure event.

16. The system of claim 15, wherein the trend engine is further configured to generate a maintenance report that includes a plurality of tasks associated with the predicted failure event.

17. A device for monitoring a performance of a plurality of mechanical joints, the device comprising:
a first communications interface communicatively coupled to a first plurality of sensors, the first communications interface being configured to receive a first plurality of measurements included in a plurality of data objects, the first plurality of measurements being received from the first plurality of sensors, the first plurality of measurements being obtained from a first mechanical joint, the first mechanical joint being one of the plurality of mechanical joints, the first plurality of measurements comprising current measurements made by the first plurality of sensors included in at least one motor included in the first mechanical joint and a plurality of bearing assemblies included in the first mechanical joint, wherein each of the plurality of bearing assemblies contacts an inboard ring and an outboard ring of the first mechanical joint; and
a trend engine configured to:
receive the first plurality of measurements via the first communications interface,
retrieve environmental data corresponding to a time period associated with the first plurality of measurements, the environmental data representing environmental conditions over the period of time,
modify the current measurements included in the first plurality of measurements, the modifying compensating for one or more environmental conditions identified by the environmental data, the one or more environmental conditions comprising solar activity experienced by the first mechanical joint;
generate time series data for the first mechanical joint by merging the plurality of data objects into a single time series data object;
generate at least one failure detection metric and an estimated time of failure based on performance data of the at least one motor and the plurality of bearing assemblies, the performance data being included in the first plurality of measurements, the failure detection metric characterizing a prediction of an operational failure event associated with the first mechanical joint, and the generating of the at least at least one failure detection metric being based, at least in part, on identifying a threshold crossing based on the performance data, and generate one or more tasks to prevent the operational failure event of the first mechanical joint, the one or more tasks identified based on the at least one failure detection metric.

18. The device of claim 17, wherein the first plurality of measurements characterizes at least one performance characteristic of the mechanical joint.

19. The device of claim 17, wherein the trend engine is further configured to generate a plurality of performance data objects based on the first plurality of measurements, wherein each performance data object characterizes a statistical representation of at least some of the plurality of measurements over a designated period of time.

20. The device of claim 19, wherein the at least one failure detection metric is generated based on at least one of the performance data objects.

* * * * *